(12) United States Patent
Regev (10) Patent No.: US 11,563,768 B2
(45) Date of Patent: Jan. 24, 2023

(54) METHODS, SYSTEMS, AND COMPUTER READABLE MEDIA FOR DETECTING AND MITIGATING EFFECTS OF TIMING ATTACKS IN TIME SENSITIVE NETWORKS

(71) Applicant: Keysight Technologies, Inc., Santa Rosa, CA (US)

(72) Inventor: Alon Regev, Woodland Hills, CA (US)

(73) Assignee: KEYSIGHT TECHNOLOGIES, INC., Santa Rosa, CA (US)

( * ) Notice: Subject to any disclaimer, the term of this patent is extended or adjusted under 35 U.S.C. 154(b) by 405 days.

(21) Appl. No.: 16/264,127

(22) Filed: Jan. 31, 2019

(65) Prior Publication Data

US 2020/0252424 A1 Aug. 6, 2020

(51) Int. Cl.
*H04L 9/40* (2022.01)
*H04J 3/06* (2006.01)
*H04L 43/062* (2022.01)
*H04L 43/16* (2022.01)
*H04L 9/00* (2022.01)
*H04W 12/61* (2021.01)
(Continued)

(52) U.S. Cl.
CPC ........ *H04L 63/1441* (2013.01); *H04J 3/0667* (2013.01); *H04L 9/005* (2013.01); *H04L 43/062* (2013.01); *H04L 43/16* (2013.01); *H04L 63/1416* (2013.01); *H04L 63/1425* (2013.01); *H04W 12/61* (2021.01); *H04L 9/12* (2013.01); *H04L 43/0852* (2013.01); *H04L 2463/121* (2013.01)

(58) Field of Classification Search
CPC .......... H04J 3/0667; H04L 9/005; H04L 9/12; H04L 43/062; H04L 43/0852; H04L 43/16; H04L 63/1416; H04L 63/1425; H04L 63/1441; H04L 69/28; H04W 12/61
See application file for complete search history.

(56) References Cited

U.S. PATENT DOCUMENTS

| 6,868,069 B2 | 3/2005 | Knobbe et al. |
| 7,092,586 B2 | 8/2006 | Vokey et al. |
| 7,272,750 B2 | 9/2007 | Sirbu |

(Continued)

FOREIGN PATENT DOCUMENTS

| CN | 101631080 A | 1/2010 |
| CN | 101854268 A | 10/2010 |

(Continued)

OTHER PUBLICATIONS

Precision Time Protocol. (Jan. 21, 2018). In Wikipedia, accessed <https://en.wikipedia.org/w/index.php?title=Precision_Time_Protocol &oldid=821617031> (Year: 2018).*

(Continued)

*Primary Examiner* — Thomas J Dailey (57) ABSTRACT

A method for providing timing security in a time sensitive network (TSN), includes monitoring TSN times in timing synchronization packets exchanged between TSN network nodes. The method further includes monitoring TSN timing values calculated by TSN network nodes. The method further includes determining, using TSN times and TSN timing values, whether a timing attack is indicated. The method further includes, in response to determining that a timing attack is indicated, performing a timing attack effects mitigation action.

20 Claims, 4 Drawing Sheets

(51) Int. Cl.
*H04L 43/0852* (2022.01)
*H04L 9/12* (2006.01)

(56) References Cited

U.S. PATENT DOCUMENTS

| | | | |
|---|---|---|---|
| 7,649,912 B2 | 1/2010 | Balasubramanian et al. | |
| 7,881,209 B2 | 2/2011 | Beliles, Jr. et al. | |
| 8,718,482 B1 | 5/2014 | Roberts | |
| 8,767,565 B2 | 7/2014 | Dalmau et al. | |
| 9,106,353 B2 | 8/2015 | Hsueh et al. | |
| 9,130,945 B2 | 9/2015 | Smith et al. | |
| 9,288,777 B2 | 3/2016 | Hollabaugh et al. | |
| 9,380,070 B1 | 6/2016 | Cain et al. | |
| 9,686,169 B2 | 6/2017 | Formby et al. | |
| 9,699,051 B2 | 7/2017 | Rata et al. | |
| 9,736,804 B2 | 8/2017 | Regev | |
| 9,800,595 B2 | 10/2017 | Jackson | |
| 9,813,226 B2 | 11/2017 | Bergeron | |
| 9,923,656 B2 | 3/2018 | Tenea et al. | |
| 10,014,937 B1 | 7/2018 | Di Mola et al. | |
| 10,019,333 B2 | 7/2018 | Regev | |
| 10,158,441 B1 | 12/2018 | Butterworth et al. | |
| 10,348,481 B1* | 7/2019 | Wetterwald | H04J 3/0658 |
| 10,425,321 B2 | 9/2019 | Joseph et al. | |
| 10,609,054 B2 | 3/2020 | Jackson | |
| 10,623,297 B2 | 4/2020 | Regev | |
| 10,965,392 B2 | 3/2021 | Regev | |
| 2002/0065929 A1 | 5/2002 | Kamentsky et al. | |
| 2002/0093917 A1 | 7/2002 | Knobbe et al. | |
| 2003/0105976 A1 | 6/2003 | Copeland, III | |
| 2003/0200483 A1 | 10/2003 | Sutton | |
| 2004/0190547 A1 | 9/2004 | Gordy et al. | |
| 2005/0207387 A1 | 9/2005 | Middleton et al. | |
| 2007/0268938 A1 | 11/2007 | Dowd | |
| 2009/0217075 A1 | 8/2009 | Adar et al. | |
| 2009/0231191 A1 | 9/2009 | Wu et al. | |
| 2009/0257354 A1 | 10/2009 | Hannel et al. | |
| 2010/0039157 A1 | 2/2010 | Kaeriyama et al. | |
| 2010/0098111 A1 | 4/2010 | Sun et al. | |
| 2011/0064091 A1 | 3/2011 | Darras et al. | |
| 2011/0170534 A1 | 7/2011 | York | |
| 2011/0199133 A1 | 8/2011 | Yamada | |
| 2011/0211473 A1 | 9/2011 | Matityahu et al. | |
| 2011/0268097 A1 | 11/2011 | Agrawala et al. | |
| 2012/0166327 A1 | 6/2012 | Amicangioli | |
| 2012/0275317 A1 | 11/2012 | Geva | |
| 2012/0320933 A1 | 12/2012 | Magee | |
| 2013/0080817 A1 | 3/2013 | Mihelic | |
| 2013/0086250 A1 | 4/2013 | Eskicioglu et al. | |
| 2013/0094515 A1 | 4/2013 | Gura et al. | |
| 2013/0100832 A1 | 4/2013 | Flinn et al. | |
| 2013/0170507 A1 | 7/2013 | Hsueh et al. | |
| 2013/0173778 A1 | 7/2013 | Hsy et al. | |
| 2013/0212439 A1 | 8/2013 | Stevens et al. | |
| 2013/0259049 A1 | 10/2013 | Mizrahi | |
| 2013/0265886 A1 | 10/2013 | Leong | |
| 2013/0278312 A1 | 10/2013 | Getzin et al. | |
| 2013/0329595 A1 | 12/2013 | Scholz | |
| 2013/0343207 A1 | 12/2013 | Cook et al. | |
| 2013/0347103 A1 | 12/2013 | Veteikis et al. | |
| 2014/0006610 A1 | 1/2014 | Formby et al. | |
| 2014/0164860 A1 | 6/2014 | Kim | |
| 2014/0185632 A1 | 7/2014 | Steiner et al. | |
| 2014/0226984 A1 | 8/2014 | Roberts et al. | |
| 2014/0247839 A1 | 9/2014 | Kingsley | |
| 2014/0269337 A1 | 9/2014 | Gintis | |
| 2014/0297852 A1 | 10/2014 | Shimizu et al. | |
| 2014/0304505 A1 | 10/2014 | Dawson | |
| 2014/0317288 A1 | 10/2014 | Krueger et al. | |
| 2014/0321285 A1 | 10/2014 | Chew et al. | |
| 2014/0344930 A1 | 11/2014 | Foley | |
| 2015/0016274 A1 | 1/2015 | Holland | |
| 2015/0023168 A1 | 1/2015 | Kotecha et al. | |
| 2015/0023170 A1 | 1/2015 | Kakadia et al. | |
| 2015/0103828 A1 | 4/2015 | Chandhoke et al. | |
| 2015/0103832 A1 | 4/2015 | Chandhoke et al. | |
| 2015/0103836 A1 | 4/2015 | Chandhoke et al. | |
| 2015/0103848 A1 | 4/2015 | Chandhoke et al. | |
| 2015/0245306 A1 | 8/2015 | Boehlke | |
| 2015/0281025 A1 | 10/2015 | Wallbaum et al. | |
| 2016/0020979 A1* | 1/2016 | Thubert | H04L 41/0803 370/252 |
| 2016/0065434 A1 | 3/2016 | Janakiraman | |
| 2016/0110211 A1 | 4/2016 | Karnes | |
| 2016/0110212 A1 | 4/2016 | Karnes | |
| 2016/0170440 A1 | 6/2016 | Aweya | |
| 2016/0285575 A1 | 9/2016 | Holmeide | |
| 2016/0301589 A1 | 10/2016 | Rata et al. | |
| 2016/0301599 A1 | 10/2016 | Porfiri et al. | |
| 2016/0306726 A1 | 10/2016 | Regev | |
| 2016/0309434 A1 | 10/2016 | Regev | |
| 2016/0315756 A1* | 10/2016 | Tenea | H04J 3/0667 |
| 2017/0041126 A1 | 2/2017 | Bergeron | |
| 2017/0085581 A1 | 3/2017 | Jackson | |
| 2017/0214703 A1 | 7/2017 | Tekchandani | |
| 2017/0331748 A1 | 11/2017 | Mangin | |
| 2018/0024537 A1* | 1/2018 | Chauvet | G06F 9/4881 718/104 |
| 2018/0070373 A1 | 3/2018 | Muench | |
| 2018/0160424 A1 | 6/2018 | Cavalcanti et al. | |
| 2018/0184438 A1 | 6/2018 | Cavalcanti et al. | |
| 2018/0191642 A1 | 7/2018 | Biederman et al. | |
| 2018/0227067 A1 | 8/2018 | Hu et al. | |
| 2018/0237039 A1 | 8/2018 | Mong et al. | |
| 2018/0295144 A1 | 10/2018 | Jackson | |
| 2018/0302330 A1 | 10/2018 | Bush | |
| 2018/0302331 A1 | 10/2018 | Bush | |
| 2018/0309655 A1 | 10/2018 | Joseph et al. | |
| 2018/0309656 A1 | 10/2018 | Regev | |
| 2018/0316592 A1 | 11/2018 | Ellegaard | |
| 2019/0123843 A1* | 4/2019 | Bush | H04L 63/061 |
| 2019/0123847 A1* | 4/2019 | Bush | H04K 1/00 |
| 2019/0349392 A1* | 11/2019 | Wetterwald | H04L 43/0852 |
| 2020/0244382 A1 | 7/2020 | Regev | |
| 2020/0366588 A1 | 11/2020 | Bergeron | |
| 2021/0112002 A1 | 4/2021 | Pan et al. | |

FOREIGN PATENT DOCUMENTS

| | | |
|---|---|---|
| CN | 101447861 B | 10/2011 |
| CN | 108737003 A | 11/2018 |
| CN | 108737003 B | 10/2021 |
| DE | 10 2018 109 689 A1 | 10/2018 |
| EP | 3 284 244 B1 | 12/2019 |
| WO | WO 2011/144263 A1 | 11/2011 |
| WO | WO 2016/168063 A1 | 10/2016 |
| WO | WO 2016/168064 A1 | 10/2016 |
| WO | WO 2017/052714 A1 | 3/2017 |

OTHER PUBLICATIONS

Non-Final Office Action for U.S. Appl. No. 15/482,672 (dated Jun. 14, 2019).

Communication under Rule 71(3) EPC for European Patent Application Serial No. 16 780 481.4 (dated May 7, 2019).

Notice of Allowance and Fee(s) Due and Examiner-Initiated Interview Summary for U.S. Appl. No. 15/482,672 (dated Dec. 18, 2019).

Decision to grant a European patent pursuant to Article 97(1) EPC for European Patent Application Serial No. 16780482.2 (dated Nov. 21, 2019).

Alhady et al., "Time-aware Traffic Shaper using Time-based Packet Scheduling in Intel I210," International Journal of Research and Engineering, vol. 5, No. 9, pp. 494-499 (Sep.-Oct. 2018).

Wisniewski et al., "Seamless Schedule Switching in Time Triggered Ethernet based Communication Systems," ResearchGate, pp. 1-11 (Nov. 2015).

Thangamuthu et al., "Analysis of Ethernet-Switch Traffic Shapers for In-Vehicle Networking Applications," Design, Automation & Test in Europe Conference & Exhibition, pp. 1-6 (2015).

(56) References Cited

OTHER PUBLICATIONS

Thangamuthu, S., Analysis of Automotive Traffic Shapers in Ethernet In-Vehicular Networks, Eindhoven University of Technology, pp. 1-89 (2014).
Boiger, Christain, "Time Aware Shaper," IEEE 802 Plenary, Deggendorf University of Applied Sciences, pp. 1-9 (May 2012).
"1588v2 Sync and Delay_Req Messages Format," http://support.huawei.com/hedex/pages/EDOC100010596830008125/05/EDOC100010596830008125/05/resources/message/cd_feature_1588v2_format-sync.html, pp. 1-2 (Downloaded Jan. 9, 2019).
Communication under Rule 71 (3) EPC Intention to Grant for European Patent Application Serial No. 16 849 136.3 (dated Dec. 12, 2019).
Final Office Action for U.S. Appl. No. 15/482,672 (dated Apr. 2, 2019).
Communication of the extended European search report for European Patent Application Serial No. 16849136.3 (dated Feb. 20, 2019).
Bhunia et al., "Hardware Trojan Attacks: Threat Analysis and Countermeasures," Proceedings of the IEEE, vol. 102, No. 8, pp. 1-20 (Aug. 2014).
Commonly-Assigned, co-pending U.S. Appl. No. 16/258,485 for "Active Network Tap Supporting Time Sensitive Network (TSN) Standards," (Unpublished, filed Jan. 25, 2019).
Non-Final Office Action for U.S. Appl. No. 15/482,672 (dated Nov. 16, 2018).
Non-Final Office Action for U.S. Appl. No. 15/498,452 (dated Nov. 5, 2018).
Moussa et al., "A Detection and Mitigation Model for PTP Delay Attack in an IEC 61850 Substation", IEEE Transactions on Smart Grid, vol. 9, No. 5, pp. 3954-3965 (Sep. 2018).
Communication of the Extended European Search Report for European Patent Application Serial No. 16780481.4 (dated Sep. 6, 2018).
Communication of the Extended European Search Report for European Patent Application Serial No. 16780482.2 (dated Aug. 9, 2018).
Communication of European publication No. and information on the application of Article 67(3) EPC for European Patent Application Serial No. 16849136.3 (dated Jul. 4, 2018).
Notice of Allowance and Fee(s) Due for U.S. Appl. No. 14/688,644 (dated Feb. 28, 2018).
Notice of Allowance and Fee(s) Due for U.S. Appl. No. 14/809,513 (dated Nov. 7, 2017).
"Time-Sensitive Networking Task," Wikipedia, the free encyclopedia, https://en.wikipedia.org/wiki/Time-Sensitive_Networking, pp. 1-7 (Aug. 29, 2017).
Non-Final Office Action for U.S. Appl. No. 14/688,644 (dated Jul. 26, 2017).
Teener, "IEEE 802 Time-Sensitive Networking: Extending Beyond AVB," Accessed on wayback machine, https://web.archive.org/web/20140724130142/http://standards.ieee.org/events/automotive/08_Teener_TSN.pdf, pp. 1-30 (Jul. 24, 2017).
Notice of Allowance and Fee(s) Due for U.S. Appl. No. 14/819,337 (dated Jun. 21, 2017).
Notice of Allowance and Fee(s) Due and Examiner Initiated Interview Summary for U.S. Appl. No. 14/860,630 (dated Jun. 13, 2017).
Non-Final Office Action for U.S. Appl. No. 14/809,513 (dated May 30, 2017).
"IEEE Standard for Local and metropolitan area networks—Bridges and Bridged Networks—Amendment 29: Cyclic Queuing and Forwarding," IEEE Computer Society, IEEE Std 802.1QchTM-2017, pp. 1-28 (May 18, 2017).
Notice of Allowance and Fee(s) Due for U.S. Appl. No. 14/688,630 (dated Apr. 12, 2017).
Non-Final Office Action for U.S. Appl. No. 14/819,337 (dated Mar. 2, 2017).
Notice of Allowance and Fee(s) Due for U.S. Appl. No. 14/685,552 (dated Mar. 1, 2017).
Notice of Allowance and Fee(s) Due for U.S. Appl. No. 13/933,661 (dated Feb. 17, 2017).
Non-Final Office Action for U.S. Appl. No. 14/860,630 (dated Dec. 19, 2016).
Non-Final Office Action for U.S. Appl. No. 14/685,552 (dated Oct. 20, 2016).
Non-Final Office Action for U.S. Appl. No. 14/688,630 (dated Oct. 17, 2016).
Non-Final Office Action for U.S. Appl. No. 13/933,661 (dated Sep. 27, 2016).
Notification of Transmittal of the International Search Report and the Written Opinion of the International Searching Authority, or the Declaration for International Application No. PCT/US2016/040532 (dated Sep. 12, 2016).
Notification of Transmittal of the International Search Report and the Written Opinion of the International Searching Authority, or the Declaration for International Application No. PCT/US2016/026534 (dated Jul. 8, 2016).
Notification of Transmittal of the International Searh report and the Written Opinion of the International Searching Authority, or the Declaration for International Application No. PCT/US2016/026533 (dated Jul. 8, 2016).
"IEEE Standard for Local and metropolitan area networks—Bridges and Bridged Networks—Amendment 26: Frame Preemption," IEEE Computer Society, IEEE Std 802.1QbuTM-2016, pp. 1-51 (Jun. 30, 2016).
Final Office Action for U.S. Appl. No. 13/933,661 (dated Apr. 12, 2016).
Non-Final Office Action for U.S. Appl. No. 13/933,661 (dated Dec. 14, 2015).
"IEEE Standard for Local and metropolitan area networks—Bridges and Bridged Networks—Amendment 25: Enhancements for Scheduled Traffic," IEEE Computer Society, IEEE Std 802.1QbvTM-2015, pp. 1-55 (Dec. 5, 2015).
"External Bypass Switches," Ixia, White Paper, 915-6688-01 Rev. B, pp. 1-5 (Dec. 2015).
"IEEE Standard for Local and metropolitan area networks—Bridges and Bridged Networks—Amendment 24: Path Control and Reservation," IEEE Computer Society, IEEE Std 802.1QcaTM-2015, pp. 1-105 (Sep. 3, 2015).
"Network Time Protocol," Wikipedia, https://en.wikipedia.org/wiki/Network_Time_Protocol, pp. 1-7 (Jul. 3, 2015).
Finn, "802.1Qav + P802.1Qbv Time-gated Shapers," Cisco System, IEEE 802 Pleanry, pp. 1-12 (Nov. 5, 2014).
"High Density Modular Fiber Tap," Ixia, http://www.ixiacom.com/products/net-optics-flex-tap, pp. 1-4 (Jul. 2014).
Watt et al., "Understanding and Applying Precision Time Protocol," Power and Energy Automation Conference, pp. 1-7 (Mar. 2014).
"Ixia Anue 3500—Mobile Backhaul Testing Solution," Ixia Data Sheet, pp. 1-5 (Dec. 2013).
Arnold, "What Are All of These IEEE 1588 Clock Types," http://blog.meinbergglobal.com/2013/10/21/ieee1588clocktypes/, News and Tutorials from Meinberg, pp. 1-6 (Oct. 21, 2013).
"AN-1838 IEEE 1588 Boundary Clock and Transparent Clock Implementation Using the DP83640," Application Report, Texas Instruments, pp. 1-9 (Apr. 2013).
"AN-1728 IEEE 1588 Precision Time Protocol Time Synchronization Performance," Application Report, SNLA098A, Texas Instruments, pp. 1-10 (Apr. 2013).
Boiger, "Deterministic Ethernet—IEEE 802.1 standards for real-time process control, industrial automation, and vehicular networks," IEEE 802 Tutorial, pp. 1-72 (Nov. 12, 2012).
Boiger, "Time Aware Shaper," Deggendorf University of Applied Sciences, IEEE 802.1 Pleanry, pp. 1-12 (Sep. 2012).
Spirent, "Precision Time Protocol (PTP) IEEE 1588," YouTube "alantalkstech", https://www.youtube.com/watch?v=yw-gd01aOYg, pp. 1-11 (Dec. 7, 2011).
"IEEE Standard for Local and metropolitan area networks—Timing and Synchronization for Time-Sensitive Applications in Bridged Local Area Networks," IEEE Computer Society, IEEE Std 802.1ASTM-2011, pp. 1-274 (Mar. 30, 2011).
Ullmann et al., "Delay Attacks—Implication on NTP and PTP Time Synchronization", ISPCS 2009 International IEEE Symposium on Precision Clock Synchronization for Measurement, Control, and Communication, pp. 1-6 (Oct. 12-16, 2009).

(56) References Cited

OTHER PUBLICATIONS

"Precision Clock Synchronization the Standard IEEE 1588", Hirschmann, White Paper, pp. 1-20. (Feb. 2009).

Eidson, "IEEE-1588 Standard for a Precision Clock Synchronization Protocol for Networked Measurement and Control Systems—A Tutorial," Agilent Technologies, pp. 1-94 (Oct. 2005).

"IEEE 1588 Precise Time Protocol: The New Standard in Time Synchronization" Microsemi Power Matters, White Paper, pp. 1-10 (Copyright 2005-2017).

Advisory Action and AFCP 2.0 Decision for U.S. Appl. No. 15/647,207 (dated Nov. 27, 2019).

Decision to grant a European patent pursuant to Article 97(1) EPC for European Patent Application Serial No. 16780481.4 (dated Sep. 12, 2019).

Notice of Allowance and Fee(s) Due for U.S. Appl. No. 15/647,207 (dated Jan. 15, 2020).

Non-Final Office Action for U.S. Appl. No. 15/647,207 (dated May 15, 2019).

Notice of Allowance and Fee(s) Due for U.S. Appl. No. 15/498,452 (dated May 10, 2019).

Final Office Action for U.S. Appl. No. 16/258,485 (dated Sep. 9, 2020).

Notice of Allowance and Examiner-Initiated Interview summary for U.S. Appl. No. 16/258,485 (dated Jan. 7, 2021).

Advisory Action for U.S. Appl. No. 16/258,485 (dated Nov. 19, 2020).

Parry et al., "A Network Forensics Tool for Precise Data Packet Capture and Replay in Cyber-Physical Systems," ACSW '16 Multiconference, pp. 1-10 (Feb. 2-5, 2016).

Non-Final Office Action for U.S. Appl. No. 16/258,485 (dated May 18, 2020).

Decision to grant a European patent pursuant to Article 97(1) EPC for European Patent Application Serial No. 16849136.3 (dated Apr. 17, 2020).

Commonly-assigned, co-pending U.S. Appl. No. 16/746,087 for "Methods, Systems, and Computer Readable Media for Measuring Schedule Update Time for a Time Aware Shaper Implementation," (Unpublished, filed Jan. 17, 2020).

Final Office Action for U.S. Appl. No. 15/647,207 (dated Sep. 12, 2019).

Communication under Rule 71(3) EPC Intention to Grant for European Patent Application Serial No. 16 780 482.2 (dated Jul. 9, 2019).

Communication of European publication No. and information on the application of Article 67(3) EPC for European Patent Application Serial No. 16780482.2 (dated Jan. 24, 2018).

Communication of European publication No. and information on the application of Article 67(3) EPC for European Patent Application Serial No. 16780481.4 (dated Jan. 24, 2018).

"Time-Sensitive Networking," Wikipedia, the free encyclopedia, https://en.wikipedia.org/wiki/Time-Sensitive_Networking, pp. 1-7 (Aug. 29, 2017).

Notice of Allowance and Fee(s) Due for Chinese Patent Application No. 201810373217.5 (dated Aug. 18, 2021).

First Office Action for Chinese Patent Application No. 201810373217.5 (dated Feb. 2, 2021).

\* cited by examiner

METHODS, SYSTEMS, AND COMPUTER READABLE MEDIA FOR DETECTING AND MITIGATING EFFECTS OF TIMING ATTACKS IN TIME SENSITIVE NETWORKS

TECHNICAL FIELD

The subject matter described herein relates to computer network security. More particularly, the subject matter described herein relates to detecting and mitigating effects of timing attacks in time sensitive networks.

BACKGROUND

In the field of computer network security, data security is often provided using authentication of the data source, detecting changes to in-flight data, preventing an unauthorized recipient from reading data by encrypting the data, and detecting missing data using packet sequence numbers. However, while these methods are suitable for detecting changes in data and preventing unauthorized access to data, they do not detect changes to packet timings. In time sensitive networks, such as IEEE 1588 compatible networks, the timing of packets is critical to applications. For example, a machine in a factory may be instructed to take a certain action at a specified time that corresponds to a part being present at the machine. If the time used by the machine is not synchronized with the time of the controller sending the instruction, the machine may act too early or too late, and damage to the part and/or injury to humans operating the machine can result. Time sensitive network standards such as IEEE 1588 ensure time synchronization between computing platforms so that actions can be coordinated.

Time sensitive networks rely on calculations of packet transit time to achieve synchronization. To alter the time synchronization, a hacker can change the timing of the packets, e.g., using a man in the middle attack, where an IEEE 1588 packet is received and delayed before being forwarded to the destination. Using this technique, a hacker can cause a phase shift, which will move time forward or backward by amount equal to the amount of delay in the packets. A hacker can also create jitter by adding random delays in packets that affect the accuracy of time. The use of interpolation to determine a future time in the IEEE 802.1AS standard can amplify this effect. Because the timing of the packet is affected, and the data of the packet is not changed, conventional security mechanisms, such as error detection codes, will not detect such timing attacks.

In IEEE 1588, a master node transmits time values in the precision protocol (PTP) domain maintained by the master node to a slave node. The slave node uses the time values along with an estimate of propagation delay between the master and slave nodes to calculate frequency and phase offsets between the PTP time maintained by the master node and the clock domain of the slave. Once the frequency and phase offsets are determined, the slave node adjusts its clock using the frequency and phase offsets to match the PTP time of the master node. If an attacker delays packets transmitted between the master node and the slave node, the slave node's version of PTP time (i.e., the adjusted time of the slave that is derived from the PTP time of the master, which will be affected by the attacker's actions) will be incorrect. In the factory example described above, a machine or a part can be damaged if its controls and/or feedback loops miscalculate data or operate asynchronously due to timing errors. In another example, transactions on a stock exchange can be invalid due to being executed at an incorrect time.

Accordingly, there exists a need for methods, systems, and computer readable media for detecting and mitigating effects of timing attacks in time sensitive networks.

SUMMARY

A method for providing timing security in a time sensitive network (TSN), includes monitoring TSN times in timing synchronization packets exchanged between TSN network nodes. The method further includes monitoring TSN timing values calculated by TSN network nodes. The method further includes determining, using TSN times and TSN timing values, whether a timing attack is indicated. The method further includes, in response to determining that a timing attack is indicated, performing a timing attack effects mitigation action. monitoring the TSN times and the TSN values includes monitoring the TSN times and the TSN values using timing attack detection and mitigation logic implemented on a network tap.

In one example, monitoring the TSN times and the TSN values includes monitoring the TSN times and the TSN values using timing attack detection and effects mitigation logic implemented on one of the TSN network nodes.

In one example, the timing attack detection and effects mitigation logic is implemented on a TSN master node or a TSN clock relay node.

In one example, determining whether a timing attack is indicated includes comparing a PTP time calculated by a PTP slave node with a PTP time maintained by a PTP master and determining that a timing attack is indicated if the PTP time calculated by the PTP slave node and the PTP master node differ by more than a threshold amount.

In one example, the PTP time calculated by the PTP slave node is transmitted to the PTP master node in a reverse sync message, and the master node compares the PTP times and determines whether the timing attack is indicated. As used herein, a reverse sync message is a message carrying the PTP time from the slave to the master for the master verifying the correctness of the time synchronization of the slave.

In one example, in response to determining that the timing attack is indicated, the PTP master node instructs the PTP slave node not to adjust its time to correspond to the PTP time maintained by the PTP master node.

In one example, determining whether a timing attack is indicated includes comparing a PTP timing synchronization message propagation delay calculated by a PTP slave node with a PTP timing synchronization message propagation delay calculated by a PTP master and determining that a timing attack is indicated if PTP timing synchronization message propagation delays differ by more than a threshold amount.

In one example, the propagation delays are calculated through the exchange of propagation delay request, propagation delay response, reverse propagation delay request, and reverse propagation delay response, sync, and reverse sync messages between the PTP master and the PTP slave nodes. In this context, the reverse messages are messages that are sent in opposite directions from the directions defined for the messages in PTP standards. For example, a propagation delay request is initiated by a PTP slave. A reverse propagation delay request is thus a propagation delay request initiated by a PTP master. Similarly, a propagation delay response is initiated by a PTP master. A reverse propagation delay response is thus initiated by a PTP slave.

In one example, performing a mitigating action includes preventing use by the PTP slave of the propagation delay calculated by the PTP master if the propagation delays differ by more than a threshold amount.

A system for providing timing security in a time sensitive network (TSN) includes at least one processor and timing attack detection and effects mitigation logic implemented by the at least one processor. The timing attack detection and effects mitigation logic is configured for monitoring TSN times in timing synchronization packets exchanged between TSN network nodes, monitoring TSN timing values calculated by TSN network nodes, determining, using TSN times and TSN timing values, whether a timing attack is indicated, and, in response to determining that a timing attack is indicated, performing a timing attack effects mitigation action.

In one example, the timing attack detection and effects mitigation logic is implemented on a network tap.

In one example, the PTP time calculated by the PTP slave node is transmitted to the PTP master node in a reverse sync message, wherein the timing attack generation and effects mitigation logic is implemented at the PTP master node and compares the PTP times and determines whether the timing attack is indicated.

In one example, in response to determining that the timing attack is indicated, the timing attack detection and effects mitigation logic implemented by the PTP master node instructs the PTP slave node not to adjust its time to correspond to the PTP time maintained by the PTP master node.

According to another example, a non-transitory computer readable medium having stored thereon executable instructions that when executed by the processor of a computer control the computer to perform steps comprising is provided. The steps include monitoring TSN times in timing synchronization packets exchanged between TSN network nodes. The steps further include monitoring TSN timing values calculated by TSN network nodes. The steps further include determining, using TSN times and TSN timing values, whether a timing attack is indicated. The steps further include in response to determining that a timing attack is indicated, performing a timing attack effects mitigation action.

The subject matter described herein may be implemented in software in combination with hardware and/or firmware. For example, the subject matter described herein may be implemented in software executed by a processor. In one exemplary implementation, the subject matter described herein may be implemented using a non-transitory computer readable medium having stored therein computer executable instructions that when executed by the processor of a computer control the computer to perform steps. Exemplary computer readable media suitable for implementing the subject matter described herein include non-transitory devices, such as disk memory devices, chip memory devices, programmable logic devices, field-programmable gate arrays, and application specific integrated circuits. In addition, a computer readable medium that implements the subject matter described herein may be located on a single device or computer platform or may be distributed across multiple devices or computer platforms.

As used herein, the term 'node' refers to at least one physical computing platform including one or more processors, network interfaces, and memory.

DETAILED DESCRIPTION

In order to detect timing-based security attacks, prevent the recipient from using incorrect timing data, and take corrective action, such as performing a shut down operation and/or informing administrators, the subject matter described herein includes timing attack detection and effects mitigation logic that resides in a network tap, in a timing synchronization network client, and/or in a timing synchronization network server. The timing attack detection and effects mitigation logic is capable of detecting when the propagation delay associated with timing synchronization packets changes over time and generating an alarm or taking another action based on the change in propagation delay. The timing attack detection and effects mitigation logic may also detect asymmetries in propagation delay between a timing synchronization network client and a time timing synchronization network server.

The timing attack detection and effects mitigation logic may be capable of detecting the following types of timing modifications performed by a hacker who is conducting a time related network attack:

1. Shifting the time of only an IEEE 1588 sync message without shifting the timing of a Pdelay_Req message or a Pdelay_Resp message, which will change the time or frequency without changing the propagation delay.
2. Shifting both the Pdelay_Req message and the Pdelay_Resp message by the same amount such that the affected propagation delay is incorrect, but not shifting the timing of the sync message. This will cause incorrect compensation for propagation delay, causing a time shift.
3. Shifting the time of only the Pdelay_Req message or only of Pdelay_Resp message or shifting these messages by different amounts. This creates a perceived asymmetry as well as a propagation delay calculation error causing time to shift.
4. Any combination of 1-3.

It should be noted that the following changes will have no effect on the actual time derived by the slave:

1. Shifting the sync, Pdelay_Req, and Pdelay_Resp message by the same amount does not cause a time shift as this effectively emulates having a higher propagation delay and the slave will correctly compensate for the time shift.
2. Shifting the sync message by an amount equal to (Pdelay_Req shift+Pdelay_Resp shift)/2. Even if the delays in the Pdelay_Req message and the Pdelay_Resp message are not equal, this will effectively eliminate an asymmetry for which the slave node should compensate, and timing will end up correct.

A first level of security that can be added by the timing attack detection and effects mitigation logic described herein for non-mobile networks is for the logic to detect changes in propagation delays calculated from Pdelay_Req and Pdelay_Resp and reject any measurements where the propagation delay value changes over time.

A second level of security that can be added by timing attack detection and effects mitigation logic is based on the assumption that wired data lines are almost symmetrical, which is a valid assumption for most short distance cables, and comparing the propagation delay in each direction, rather than averaging the propagation delays. By doing this, any type of attack that causes asymmetry can be detected by the slave and the data can be discarded. If the asymmetry continues, corrective action, such as generating a security alert, can be performed.

Figure 1:
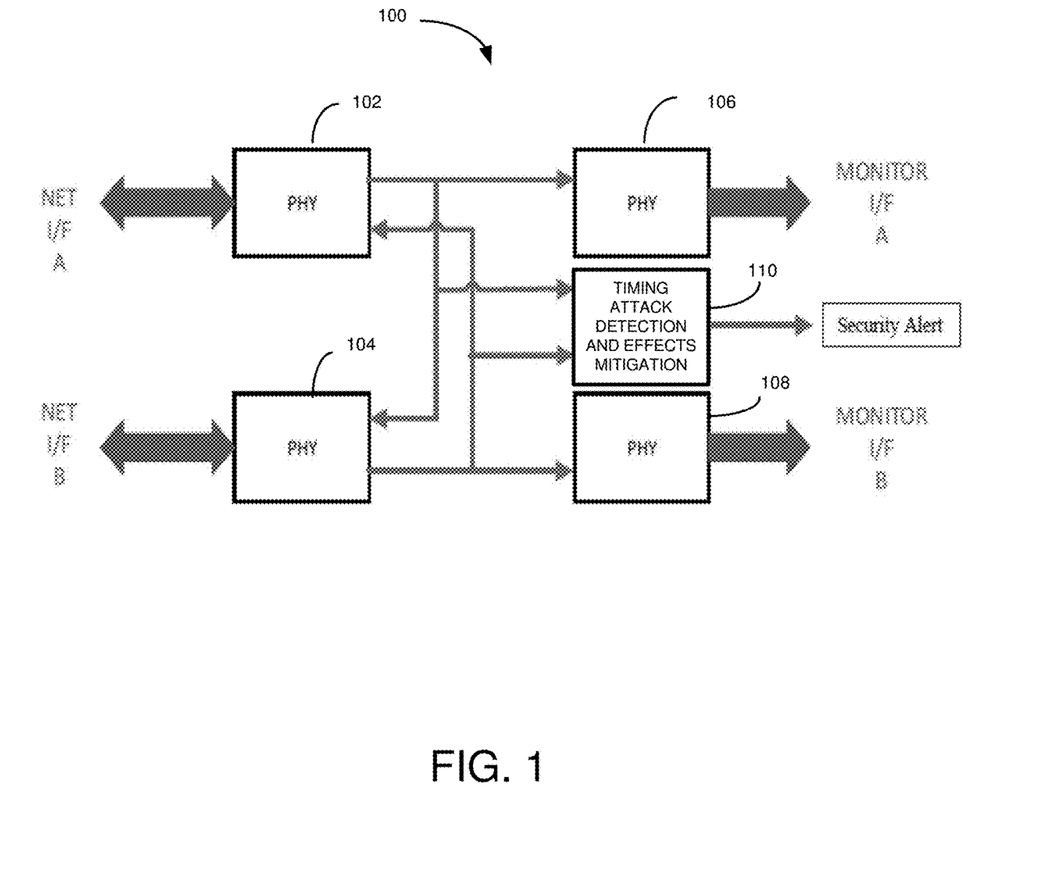
FIG. 1 is a block diagram of a network tap with timing attack detection and effects mitigation logic.

In one exemplary implementation of the subject matter described herein, the timing attack detection and effects mitigation logic can be located on a network tap that observes timing synchronization messages, such as IEEE 1588 precision time protocol messages, and detects timing-based attacks. FIG. 1 is a block diagram of a network tap with timing synchronization observation logic. Referring to FIG. 1, network tap 100 includes network port physical layer interfaces 102 and 104 that are designed to function as inline network taps to monitor traffic in a network and to provide copies of the monitored traffic to monitor port physical layer interfaces 106 and 108 associated with monitor ports. For example, network port physical layer interface 102 receives traffic from the network and loops the traffic back to the network via network port physical layer interface 104. A copy of the traffic also provided to monitor port physical layer interface 106. Similarly, network port physical layer interface 104 receives network traffic and loops the network traffic back to the network via network port physical layer interface 102. Network port physical layer interface 104 also provides a copy of the monitored traffic to monitor port physical layer interface 108.

Timing attack detection and effects mitigation logic 110 receives copies of the traffic from network port physical layer interfaces 102 and 104 and performs the steps described herein for detecting and mitigating timing attacks. Timing attack detection and effects mitigation logic 110 may include or be implemented by at least one processor and a memory storing instructions for instructing the processor to perform the steps described herein for detecting and mitigating timing attacks. Although the examples described herein relate to observing IEEE 1588 timing synchronization packets, timing attack detection and effects mitigation logic may detect timing related attacks based on timing information derived from any suitable timing synchronization network protocol where packets are exchanged between nodes to synchronize timing. Timing attack detection and effects mitigation logic 110 may also initiate a corrective action, such as generating security alerts.

In the example illustrated in FIG. 1, timing attack detection and effects mitigation logic 110 is implemented on a network tap. Such a network tap may be located at an IEEE 1588 master node or in-line between an IEEE 1588 master node and an IEEE 1588 slave node. Alternatively, rather than implementing timing attack detection and effects mitigation logic 110 in the network tap, timing attack detection and effects mitigation logic 110 may be implemented as a component of an IEEE 1588 master node. In yet another alternate implementation, timing attack detection and effects mitigation logic 110 may be implemented as a network tool that is separate from network tap 100 that receives copies of timing synchronization packets from network tap 100 via physical layer interfaces 106 and 108.

Figure 2:
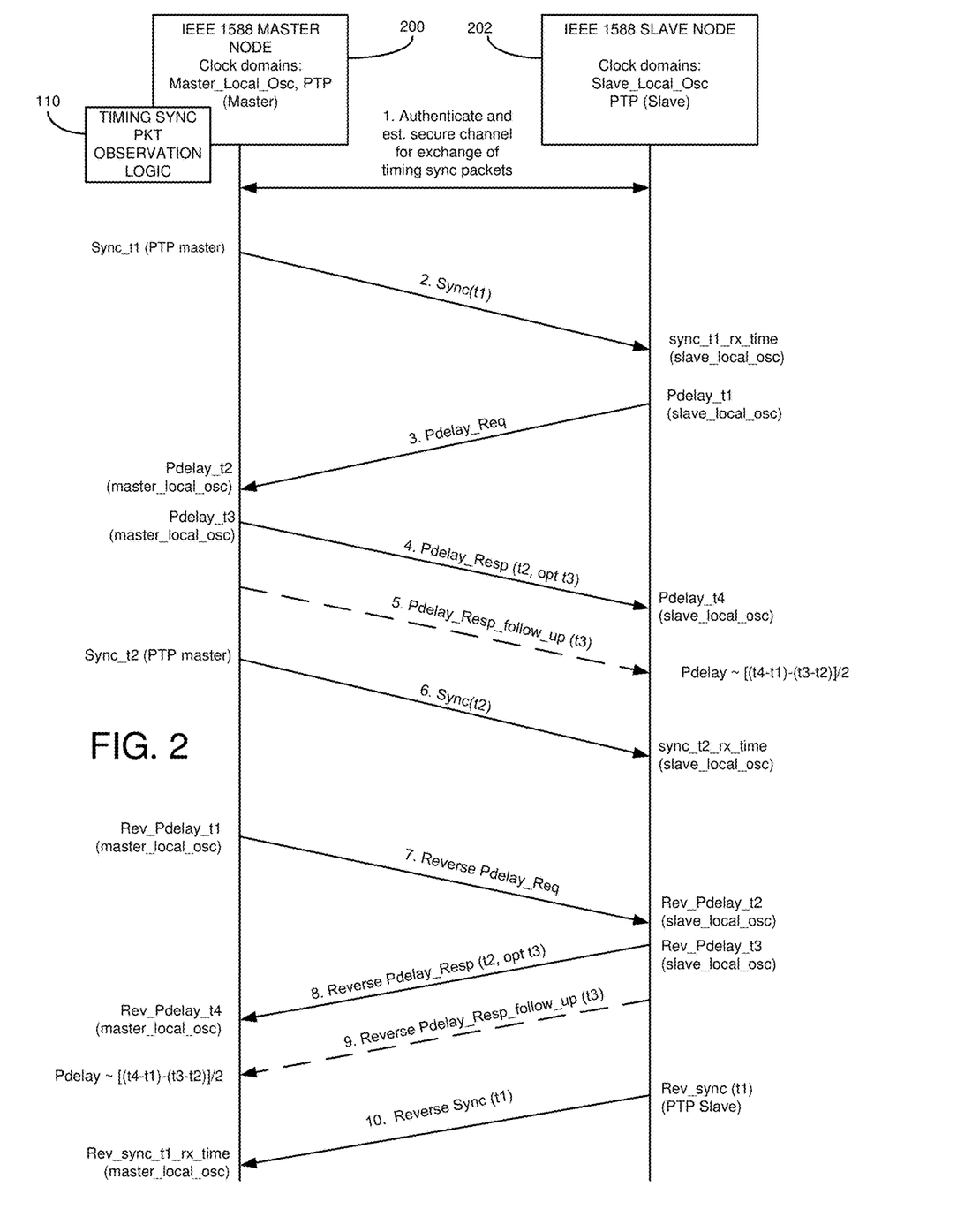
FIG. 2 is a message flow diagram illustrating the exchange of timing synchronization messages between TSN network nodes.

In general, a method where the slave shares information with the master and they validate data before accepting it (and adjusting the slave's timing) can detect and mitigate the effects of timing attacks. FIG. 2 is a message flow diagram illustrating an exchange of timing synchronization messages between a master and a slave that can be used to detect the presence of timing synchronization attacks. In FIG. 2, timing attack detection and effects mitigation logic 110 is located at master node 200 because master node 200, through the exchange of timing protocol packets with slave node 202, has the timing information viewed as correct or accurate that can be used to detect timing related attacks. In FIG. 2, IEEE 1588 master node 200 maintains the following time or clock domains: Master_Local_Osc, which is the time of the local oscillator of the master, and PTP(Master), which is the PTP time maintained by the master to which the slave synchronizes its PTP time. Slave node 202 maintains the following clock domains: Slave_Local_Osc, which is the time of the local oscillator of the slave, and PTP(Slave), which is the PTP time calculated by the PTP slave node 202 based on the PTP time maintained by master node 200.

In line 1 of the message flow diagram illustrated in FIG. 2, master and slave nodes 200 and 202 authenticate each other and optionally use encryption for the subsequent exchange of timing synchronization messages. In line 2 of the diagram illustrated in FIG. 2, master node 200 sends a forward sync to slave node 202. The forward sync may include the transmission time t1 of the forward sync message recorded in the PTP time maintained by master node 200. the transmission time t1 of the forward sync message may also be transmitted in a separate follow-up message to the forward sync message. Slave node 202 receives the forward sync message and records the time of receipt of the forward sync message in the time domain of slave node 202.

In line 3 of the message flow diagram, slave node 202 sends a Pdelay_Req message to master node 200 and records the transmission time t1 of the Pdelay_Req in the time domain of the slave local oscillator. Master node 200 receives the Pdelay_Req and records the time t2 in the time domain of the master node 200 local oscillator. In line 4 of the message flow diagram, master node 200 sends a Pdelay_Resp to slave node 202 and records the time of transmission t3 of the Pdelay_Resp in the time domain of the master node 200 local oscillator. The Pdelay_Resp includes the time t2 of receipt of the Pdelay_Req in the time domain of the master node 200 local oscillator. The Pdelay_Resp may optionally include the time t3 of the transmission of the Pdelay_Resp, or the time t3 of transmission of the Pdelay_Resp can be transmitted to slave node 202 in a Pdelay_Resp_Follow_Up message, as indicated by line 5 of the message flow illustrated in FIG. 2. Once slave node 202 receives the Pdelay_Resp, slave node 202 records the time of receipt t4 of the Pdelay_Resp in the time domain of the local oscillator of slave node 202.

After line 5 of the message flow diagram, slave node 202 can estimate the one-way propagation delay between master and slave nodes 200 and 202 using the following approximation:

Pdelay~$[(t4-t1)-(t3-t2)]/2$ The expression is an approximation because it does not consider the difference in oscillator frequencies between the master and slave during the delay between master node 200 receiving the Pdelay_Req and transmitting the Pdelay_Resp. However, this delay may be negligible, and the approximation for one-way propagation delay may be useful in detecting timing attacks when compared to the corresponding approximation calculated by master node 200 (or the timing synchronization observation logic residing at master node 200).

In line 6 of the message flow diagram, master node 200 sends a sync message to slave node 202 and records the time of transmission t2 of the sync message in the PTP time domain maintained by master node 200. Slave node 202 records the time of receipt t2 of the sync message in the time domain of the slave local oscillator.

In line 7 of the message flow diagram, master node 200 sends a reverse Pdelay_Req to slave node 202 and records the time t1 of transmission of the reverse Pdelay_Req in the time domain of the master node 200 local oscillator. Slave node 202 receives the reverse Pdelay_Req and records the time t2 of receipt of the reverse Pdelay_Req in the time domain of the slave local oscillator. In line 8 of the message flow diagram, slave node 202 sends a reverse Pdelay_Req to master node 200 and records the time t3 of transmission of the reverse Pdelay_Resp in the time domain of the slave local oscillator. The reverse Pdelay_Resp includes the time t2 of receipt of the reverse Pdelay_Req and optionally the time t3 of transmission of the reverse Pdelay_Resp. Master node 200 records the time of receipt t4 of the reverse Pdelay_Resp_Follow_Up in the time domain of the local oscillator of master node 200. Alternatively, the time t3 of transmission of the reverse Pdelay_Resp can be transmitted to master node 200 in a reverse Pdelay_Resp_Follow_Up message, as indicated by line 9 of the message flow diagram.

Once master node 200 receives the time t3 of transmission of the reverse Pdelay Resp_Follow_Up, master node 200 and/or the timing attack detection and effects mitigation logic can calculate its approximation of the one-way propagation delay using the following approximation:

$$P\text{delay} \sim [(t4-t1)-(t3-t2)]/2$$

This approximation can be compared with the approximation calculated by slave node 202 after line 5. If the values differ by more than a threshold amount, timing attack detection and effects mitigation logic may indicate the presence of a timing attack.

In line 10 of the message flow diagram, slave node 202 sends a reverse sync to master node 200 containing the time t1, which is the PTP time calculated by slave node 202 from the PTP time received from master node 200 in line 1 with frequency and phase adjustments calculated by slave node 202. The frequency and phase adjustments and the PTP time t1 of slave node 202 may be calculated as follows:

PTP_Slave_freq_corr=(Sync_t2−Sync_t1)/
(sync_t2_rx_time−Sync_t1_rx_time)

PTP_Slave_phase_corr=Sync_t1−Sync_t1_rx_time+
Pdelay

PTP_Slave_Time=(slave_local_osc+PTP_Slave_
phase_corr)+

PTP_Slave_freq_corr*(slave_local_osc−
Sync_t1_rx_time)).

In the first equation, PTP_Slave_freq_corr is the frequency correction factor between the slave's local oscillator and master node 200's local oscillator and is calculated from the ratio of the difference in transmission times of the sync messages recorded in the PTP time maintained by master node 200 to the difference in receipt times of the sync messages recorded in the time domain of the local oscillator of slave node 202.

In the second equation, PTP_Slave_phase_corr is the phase correction of the time domain of the slave local oscillator relative to the PTP master time domain maintained by master node 200. The phase correction is determined by the difference in the transmission time t1 of the sync message recorded in the PTP time maintained by master node 200 and the receipt time t2 of the sync message recorded in the time domain of the local oscillator of slave node 202 plus the propagation delay.

In the third equation, the PTP time of slave node 202 is calculated by adding the phase correction from the second equation to the current value of the local oscillator of slave node 202 and adding to this value a correction factor based on the difference in oscillator frequencies of master node 200 and slave node 202.

After the calculating the third equation, slave node 202 would normally update its PTP time to match the calculated value for PTP slave time. However, rather than doing so, slave node 202 may send the calculated PTP slave time (as in line 10 of FIG. 2) to master node 200, and master node 200 may compare the calculated slave PTP time to the master PTP time—either originated by master node 200 or received from another reliable clock source upstream from master node 200. If the slave PTP time differs from master PTP time by more than a threshold amount, the timing attack detection and effects mitigation logic may indicate a timing attack and instruct slave node 202 not to update the slave PTP time.

In summary, the following logic may be used to detect the presence of timing synchronization attacks.

1. All timing synchronization message exchanges need to use authentication (and optionally encryption) to protect the messages themselves. Any suitable standard can be used for authenticating master node 200 and slave node 202 with each other. The authentication between master node 200 and slave node 202 is illustrated by line 1 in the message flow in FIG. 2.
2. Slave node 202 sends its version of time back to master node 200 using a reverse sync. The reverse sync is indicated in line 10 of the message flow in FIG. 2. As indicated above, if the slave's calculated PTP time differs from the PTP time of master node 200 by more than a threshold amount, master node 200 may instruct slave node 202 not to update its PTP time because of a possible timing attack.
3. Master node 200 initiates a Pdelay_Req to measure the propagation delay (so both master node 200 and slave node 202 measure propagation delays). Slave node 202 and master node 200 each send their measured propagation delays as well as the four time values (t1, t2, t3, and t4) to each other.
  a. In Pdelay_Req, the initiator knows t1 and t4 in the local time of the initiator; t2 and t3 in remote oscillator time.
  b. If the initiator later sends t1 and t4 in PTP time to the responder, the responder knows t2 and t3, and the responder can compare t1 (in PTP) to t2 (in PTP) and expect to have them differ by the measured propagation delay.
  a. If the responder later sends t2 and t3 in PTP time to the initiator, the initiator knows t1 and t4, and the initiator can compare t2 (in PTP) to t1 (in PTP) and expect them to differ by the measured propagation delay.
  d. Same for t3 and t4—if the initiator communicates t4 in PTP time to the responder, the responder can compare t3 (in PTP) to t4 (in PTP) and expect the difference to be equal to the propagation delay.
  If any of the differences in (a)-(d) exceed the propagation delay by more than a threshold, a timing attack may be indicated.
4. If the propagation delays measured by master node 200 and slave node 202 do not match (are off by more than an acceptable amount), this is an indication of a timing attack or a synchronization error in the system.

5. The one-way delays in the of the Pdelay_Req from slave node 202 to master node 200 should match the one-way delay of the Pdelay_Resp from slave node 202 to master node 200. If the one-way delays differ by more than a threshold amount, a timing attack or system error may be indicated.
6. The one-way delays in the of the Pdelay_Resp from slave node 202 to master node 200 should match the one-way delay of the Pdelay_Req from slave node 202 to master node 200. If the one-way delays differ by more than a threshold amount, a timing attack or system error may be indicated. If the one-way delay of the Pdelay_Req sent by slave node 202 does not match the one-way delay of the forward sync message, then this is an indication of timing attack or system error.
7. If the one-way delay of the Pdelay_Req sent by master node 200 does not match the delay of the reverse sync message, then this is an indication of a timing attack or system error.
8. The delays of the sync messages themselves should be the same in both directions (or off by no more than a threshold amount): slave_sync_rx_time−master_sync_tx_time should be the same as master_reverse_sync_rx_time−slave_reverse_sync_tx_time.
9. Master node 200 should compare the Reverse sync tx time (t1, slave PTP domain)+pdelay against master node 200's current PTP time. If this differs by more than an acceptable threshold, this indicates an attack.
10. Slave node 202 should not accept a new time or propagation delay until exchanging the data with master node 200 (in a secure fashion) and verifying that all rules pass.

By applying the rules above, delays of Sync, Pdelay_Req, and Pdelay_Resp that cause time to be wrong can be detected. Following all steps above, to keep slave node 202 from updating time during a timing attack:

After master node 200 sends a sync message, slave node 202 can "emulate" the changes to PTP time (without changing its PTP time) and send a reverse_sync using the "emulated" PTP time. Master node 200 can then verify this time and let slave node 202 know that it's ok to accept the original Sync message (at which point slave node 202 can make any updates to its "real" PTP time.

Figure 3:
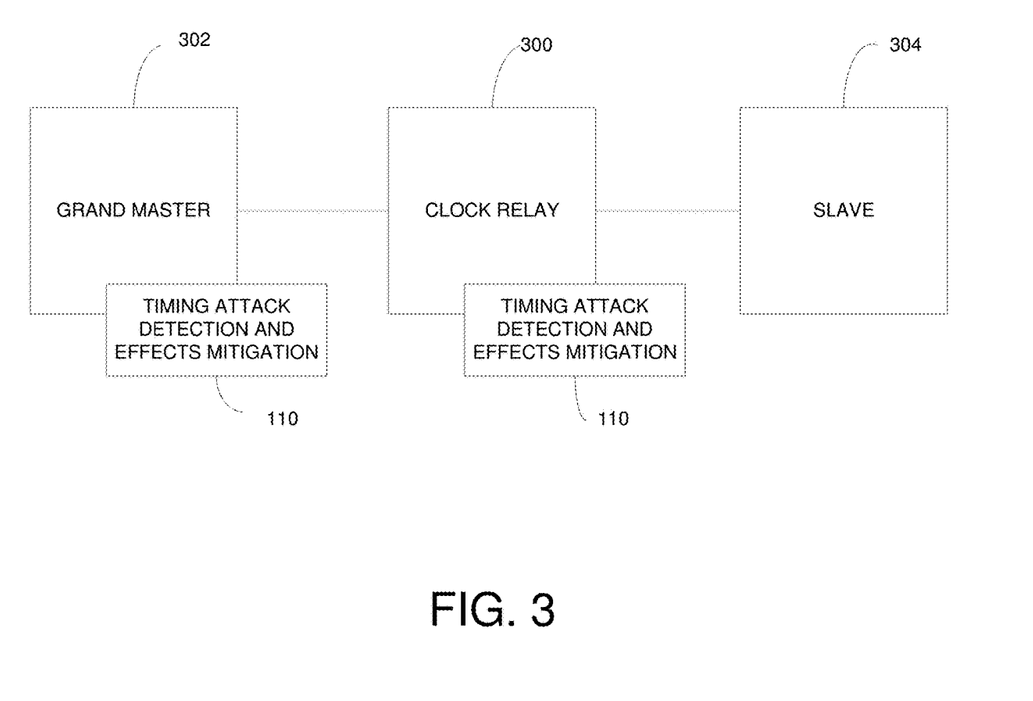
FIG. 3 illustrates example location of timing attack detection and effects mitigation logic when more than two TSN nodes are present.

It should be noted that while the timing attack detection in FIG. 2 is performed by logic implemented at a PTP master to detect and prevent timing errors at a PTP slave, the timing attack detection and prevention can occur at any upstream node, such as a timing relay, for any downstream node that receives time from the upstream node. FIG. 3 illustrates this case. In FIG. 3, a clock relay 300 syncs its time to a PTP grand master 302. A PTP slave 304 syncs its time to clock relay 300. In this arrangement, timing attack detection logic 110 that implements the steps above described with respect to FIG. 2 can be implemented at timing relay 300 to detect and prevent timing attacks between timing relay 300 and slave 304 as well as at PTP grand master 302 to prevent timing attacks between PTP grand master 302 and clock relay 300.

Figure 4:
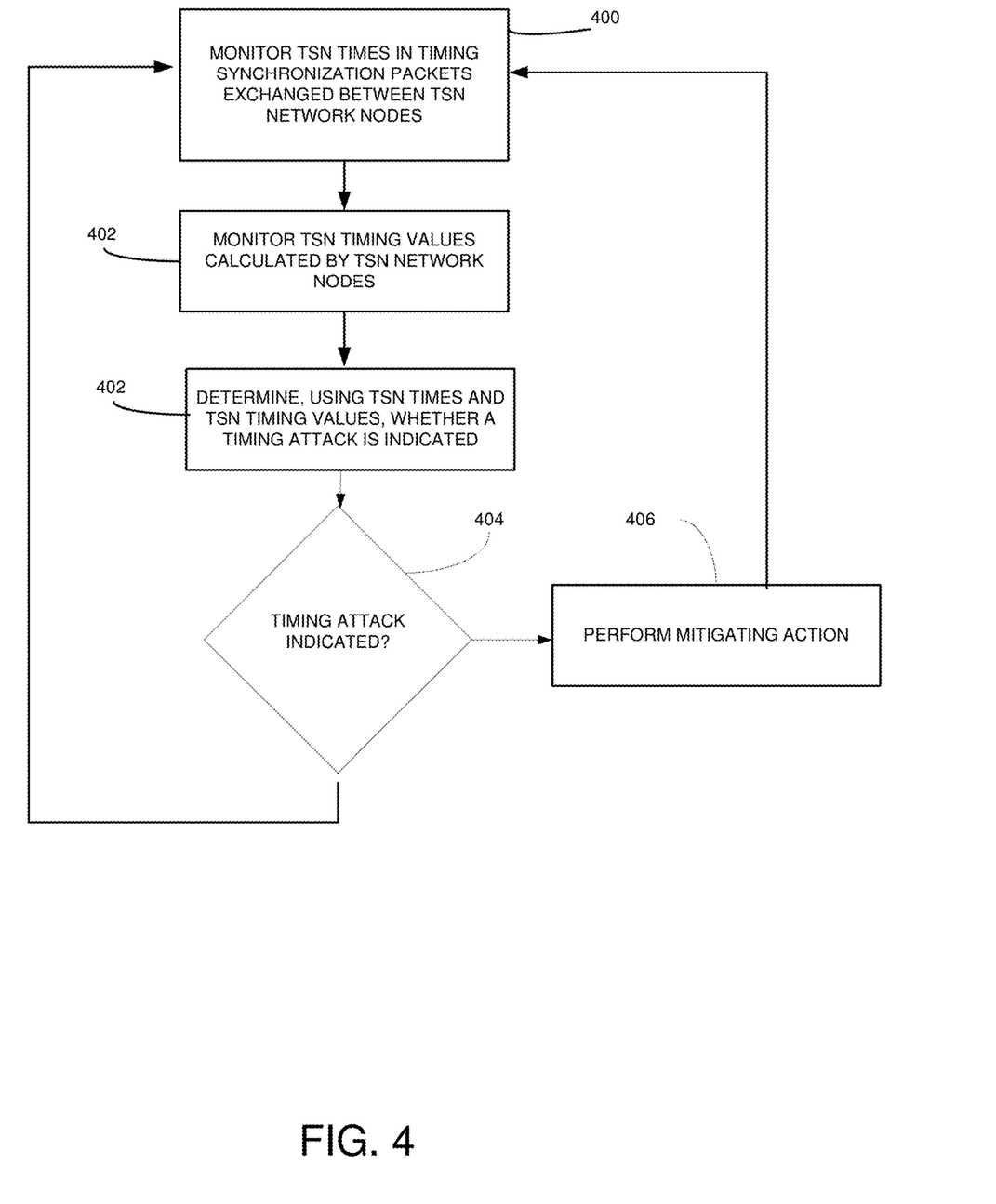
FIG. 4 is a flow chart illustrating an exemplary process that may be performed by timing attack detection and effects mitigation logic in detecting and mitigating effects of timing attacks.

FIG. 4 is a flow chart illustrating an exemplary process that may be implemented by timing attack detection and effects mitigation logic 110 in detecting and preventing timing attacks. Referring to FIG. 4, in step 400, TSN times in timing synchronization packets exchanged between TSN network nodes are monitored. For example, the values t1, t2, t3, and t4 calculated by TSN master, slave, and relay nodes may be monitored.

In step 402, TSN timing values calculated by TSN network nodes are monitored. For example, timing values calculated in PTP time, propagation delay values, phase offsets, etc., calculated by a PTP masters, PTP slaves, and PTP clock relays may be monitored.

In steps 402 and 404 it is determined whether the monitored values indicate a timing attack. For example, the steps described above with regard to FIG. 2 may be implemented to determine whether a timing attack is present.

If a timing attack is determined to be present, control proceeds to step 406 where an attack mitigation action is performed. As stated above, examples of attack mitigation actions may include preventing the updating of time by a PTP slave node, generating an alarm, etc.

Thus, using timing attack detection and effects mitigation logic 110, the technological field of computer network security is improved. For example, network attacks that are based on packet timing alone can be detected when the content of timing synchronization packets is not modified by the attacker. Implementing timing attack detection and effects mitigation logic 110 on a network tap further improves the field of computer network security because security monitoring is transparent to the IEEE 1588 master and slave nodes and does not require software modification to either node to implement the security procedures described herein.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:
1. A method for providing timing security in a time sensitive network (TSN), the method comprising:
monitoring TSN times in timing synchronization packets exchanged between TSN network nodes, wherein monitoring TSN times includes monitoring time values transmitted in the timing synchronization messages;
monitoring TSN timing values calculated by TSN network nodes, wherein monitoring the TSN timing values calculated by the TSN network nodes includes communicating the TSN timing values in reverse messages, wherein the reverse messages are messages sent in opposite directions from directions defined for messages in precision time protocol (PTP) standards;
determining, using the TSN times transmitted in the timing synchronization messages and the TSN timing values calculated by the TSN network nodes, whether a timing attack is indicated; and
in response to determining that a timing attack is indicated, performing a timing attack effects mitigation action, wherein performing the timing attack effects mitigation action includes preventing the updating of time by a PTP slave node by transmitting a message to the PTP slave node instructing the PTP slave node not to update its PTP time, wherein the PTP time of the PTP slave node is an adjusted time of the PTP slave node calculated by the PTP slave node from a timing synchronization message delayed by an attacker.
2. The method of claim 1 wherein monitoring the TSN times and the TSN values includes monitoring the TSN times and the TSN values using timing attack detection and effects mitigation logic implemented on a network tap.

3. The method of claim 1 wherein monitoring the TSN times and the TSN values includes monitoring the TSN times and the TSN values using timing attack detection and effects mitigation logic implemented on one of the TSN network nodes.

4. The method of claim 3 wherein the timing attack detection and effects mitigation logic is implemented on a TSN master node or a TSN clock relay node.

5. The method of claim 1 wherein determining whether a timing attack is indicated includes comparing the PTP time calculated by the PTP slave node with a PTP time maintained by a PTP master node and determining that a timing attack is indicated if the PTP time calculated by the PTP slave node and the PTP master node differ by more than a threshold amount.

6. The method of claim 5 wherein communicating the TSN timing values in reverse messages includes transmitting the PTP time calculated by the PTP slave node to the PTP master node in a reverse sync message, wherein the PTP master node compares the PTP times and determines whether the timing attack is indicated.

7. The method of claim 6, wherein, in response to determining that the timing attack is indicated, the PTP master node transmits the message to the PTP slave node instructing the PTP slave node not to adjust its PTP time to correspond to the PTP time maintained by the PTP master node.

8. The method of claim 1 wherein determining whether a timing attack is indicated includes comparing a PTP timing synchronization message propagation delay calculated by the PTP slave node with a PTP timing synchronization message propagation delay calculated by a PTP master and determining that a timing attack is indicated if PTP timing synchronization message propagation delays differ by more than a threshold amount.

9. The method of claim 8 wherein the propagation delays are calculated through the exchange of propagation delay request, propagation delay response, reverse propagation delay request, and reverse propagation delay response, sync, and reverse sync messages between the PTP master and the PTP slave nodes.

10. The method of claim 9 wherein performing a mitigating action includes preventing use by the PTP slave node of the propagation delay calculated by the PTP master node if the propagation delays differ by more than a threshold amount.

11. A system for providing timing security in a time sensitive network (TSN), the system comprising:
   at least one processor; and
      timing attack detection and effects mitigation logic implemented by the at least one processor for:
      monitoring TSN times in timing synchronization packets exchanged between TSN network nodes, wherein monitoring TSN times includes monitoring time values transmitted in the timing synchronization messages;
      monitoring TSN timing values calculated by TSN network nodes, wherein monitoring the TSN timing values calculated by the TSN network nodes includes communicating the TSN timing values in reverse messages, wherein the reverse messages are messages sent in opposite directions from directions defined for messages in precision time protocol (PTP) standards;
      determining, using the TSN times transmitted in the timing synchronization messages and the TSN timing values calculated by the TSN network nodes, whether a timing attack is indicated; and
      in response to determining that a timing attack is indicated, performing a timing attack effects mitigation action, wherein performing the timing attack effects mitigation action includes of preventing the updating of time by a PTP slave node by transmitting a message to the PTP slave node instructing the PTP slave node not to update its PTP time, wherein the PTP time of the PTP slave node is an adjusted time of the PTP slave node calculated by the PTP slave node from a timing synchronization message delayed by an attacker.

12. The system of claim 11 wherein the timing attack detection and effects mitigation logic is implemented on a network tap.

13. The system of claim 11 wherein the timing attack detection and effects mitigation logic is implemented on one of the TSN network nodes.

14. The system of claim 13 wherein the timing attack detection and effects mitigation logic is implemented on a TSN master node or a TSN clock relay node.

15. The system of claim 11 wherein determining whether a timing attack is indicated includes comparing the PTP time calculated by the PTP slave node with a PTP time maintained by a PTP master node and determining that a timing attack is indicated if the PTP time calculated by the PTP slave node and the PTP master node differ by more than a threshold amount.

16. The system of claim 15 wherein the PTP time calculated by the PTP slave node is transmitted to the PTP master node in a reverse sync message and wherein the timing attack generation and effects mitigation logic is implemented at the PTP master node and compares the PTP times and determines whether the timing attack is indicated.

17. The system of claim 16, wherein, in response to determining that the timing attack is indicated, the timing attack detection and effects mitigation logic implemented by the PTP master node transmits the message to the PTP slave node instructing the PTP slave node not to adjust its time to correspond to the PTP time maintained by the PTP master node.

18. The system of claim 11 wherein determining whether a timing attack is indicated includes comparing a PTP timing synchronization message propagation delay calculated by the PTP slave node with a PTP timing synchronization message propagation delay calculated by a PTP master and determining that a timing attack is indicated if PTP timing synchronization message propagation delays differ by more than a threshold amount.

19. The system of claim 18 wherein the propagation delays are calculated through the exchange of propagation delay request, propagation delay response, reverse propagation delay request, and reverse propagation delay response, sync, and reverse sync messages between the PTP master and the PTP slave nodes and wherein performing a mitigating action includes preventing use by the PTP slave node of the propagation delay calculated by the PTP master node if the propagation delays differ by more than a threshold amount.

20. A non-transitory computer readable medium having stored thereon executable instructions that when executed by a processor of a computer control the computer to perform steps comprising:

monitoring TSN times in timing synchronization packets exchanged between TSN network nodes, wherein monitoring TSN times includes monitoring time values transmitted in the timing synchronization messages;

monitoring TSN timing values calculated by TSN network nodes, wherein monitoring the TSN timing values calculated by the TSN network nodes includes communicating the TSN timing values in reverse messages, wherein the reverse messages are messages sent in opposite directions from directions defined for messages in precision time protocol (PTP) standards;

determining, using the TSN times transmitted in the timing synchronization messages and TSN timing values calculated by the TSN network nodes, whether a timing attack is indicated; and in response to determining that a timing attack is indicated, performing a timing attack effects mitigation action, wherein performing the timing attack effects mitigation action includes preventing the updating of time by a PTP slave node by transmitting a message to the PTP slave node instructing the PTP slave node not to update its PTP time, wherein the PTP time of the PTP slave node is an adjusted time of the PTP slave node calculated by the PTP slave node from a timing synchronization message delayed by an attacker.

\* \* \* \* \*

UNITED STATES PATENT AND TRADEMARK OFFICE
CERTIFICATE OF CORRECTION

| | |
|---|---|
| PATENT NO. | : 11,563,768 B2 |
| APPLICATION NO. | : 16/264127 |
| DATED | : January 24, 2023 |
| INVENTOR(S) | : Alon Regev |

It is certified that error appears in the above-identified patent and that said Letters Patent is hereby corrected as shown below:

In the Claims

In Column 12, Line 8, in Claim 11, after "includes" delete "of".

Signed and Sealed this
Twenty-first Day of March, 2023

*Katherine Kelly Vidal*

Katherine Kelly Vidal
*Director of the United States Patent and Trademark Office*